United States Patent [19]

Andersson et al.

[11] Patent Number: 4,984,601
[45] Date of Patent: Jan. 15, 1991

[54] UNIT APT TO ACT UPON THE FLOW

[75] Inventors: Sven-Arne Andersson, Veberöd; Anders Sundberg, Malmö, both of Sweden

[73] Assignee: AB Profor, Lund, Sweden

[21] Appl. No.: 404,571

[22] Filed: Sep. 8, 1989

[30] Foreign Application Priority Data

Sep. 22, 1988 [SE] Sweden .................... 8803352

[51] Int. Cl.$^5$ ................ F16K 31/04; G05D 7/06
[52] U.S. Cl. ...................... 137/486; 137/487.5; 251/129.11; 251/161
[58] Field of Search ............ 251/129.11, 161, 65; 137/486, 487.5

[56] References Cited

U.S. PATENT DOCUMENTS

| | | |
|---|---|---|
| 2,536,813 | 2/1951 | Jones et al. |
| 2,589,183 | 3/1952 | DeCraene et al. |
| 2,687,277 | 8/1954 | Bremer et al. |
| 4,353,523 | 10/1982 | Palti ............ 251/129.11 X |
| 4,452,423 | 6/1984 | Beblavi ......... 251/129.11 X |
| 4,789,132 | 12/1988 | Fujita ............ 251/129.11 |
| 4,794,947 | 1/1989 | Kuramochi ........ 137/486 |
| 4,796,651 | 1/1989 | Ginn ............ 137/487.5 X |

FOREIGN PATENT DOCUMENTS 32221 7/1981 European Pat. Off.
1600717 1/1945 Fed. Rep. of Germany.
1908136 12/1970 Fed. Rep. of Germany.

Primary Examiner—Alan Cohan
Attorney, Agent, or Firm—Burns, Doane, Swecker & Mathis

[57] ABSTRACT

Means acting upon the flow, such as pumps or valves are used inter alia in the handling of liquid foodstuffs, e.g. milk, in packing machines. Since the demands on hygiene in this context are very high, especially if the packing machine operates with foodstuff sterilized beforehand, it is a disadvantage that manoeuvering devices for the means acting upon the flow have to pass from the outside into the sterile flow path where the means is located. This is avoided in accordance with the invention in that the means (3) acting upon the flow is combined with an actuator (8) which can be acted upon electromagnetically by a stator (7) isolated from the flow path.

10 Claims, 1 Drawing Sheet

UNIT APT TO ACT UPON THE FLOW

The present invention relates to a unit apt to act upon the flow comprising a driving means with a stator and an actuator connected to a device situated in the flow path which acts upon the flow.

In the transport of fluids, especially liquids of different degrees of viscosity, devices acting upon the flow are used for the control of the flow rate. As examples of devices acting upon, or controlling, the flow may be mentioned various types of pumps, but also valves, throttles and similar devices, above all for the reduction of the flow rate.

In the handling of certain types of fluids, e.g. liquid foodstuffs such as milk, sour milk, juice or the like very high demands are made on hygiene, so that the devices which are used e.g. for controlling the flow rate in these media must be designed so that they do not possess any complicatedly formed passages, pockets or other spaces which are difficult to clean. This is even more important in those cases where the fluid consists of a liquid sterilized beforehand, e.g. milk sterilized through heat treatment. This is often the case e.g. in packing machines where sterile milk is conducted continuously or in batches down into presterilized packing containers which are closed so as to be liquid-tight and microbiologically under sterile conditions. An uninterrupted sterility has to be ensured right from the sterilizer, where the fluid is sterilized, and up to the packing machine wherein the packing container filled with sterile contents is closed. The intermediate flow path thus not only has to be immaculate from a point of view of hygiene, that is to say it should be simple to wash and to sterilize, but it also has to be completely sealed off (also from a microbiological aspect) towards the non-sterile environment. It is an aim, therefore, that the flow path should not contain any manoeuvring devices such as movable axles or the like which extend into the flow path from the non-sterile outside. This is an aim, though, which until now has been difficult to achieve since means acting upon the flow in the shape of pumps or valves necessary in the flow path had to be manoeuvred and controlled from the outside. Even though in practice it ought to be possible e.g. to build an enclosed, electric pump motor into a flow path, the movable part of the motor has to be sealed from the motor by means of a movable seal which, on the one hand, causes problems in connection with sterilization (thermal or chemical) of the device and, on the other hand, creates risks of a connection between the non-sterile interior of the motor and the flow path with non-sterility as a consequence.

It is an object of the present invention to overcome the abovementioned difficulties and provide a unit apt to act upon the flow wherein a flow path provided with devices acting upon the flow is wholly isolated from adjoining non-sterile spaces.

It is a further object of the present invention to provide a unit apt to act upon the flow which is not subject to the disadvantages affecting previously known similar units.

It is a further object of the present invention to provide a unit apt to act upon the flow, this unit being wholly without movable seals arranged in contact with the pumped fluid.

It is a further object of the present invention finally to provide a unit apt to act upon the flow which is simple to wash and sterilize and therefore suitable for use on packing machines of the type which fill previously sterilized contents ino sterile packing containers.

These and other objects have been achieved in accordance with the invention in that a unit apt to act upon the flow comprising a driving means with a stator and an actuator connected to a device situated in the flow path which acts upon the flow has been given the characteristic that the actuator is situated in the flow path and is mechanically separated from the stator which is situated outside the flow path and is separated in a liquid-tight manner from the same.

Preferred embodiments of the unit in accordance with the invention have been given, moreover, the characteristics which are evident from the subsidiary claims 2-16.

By designing the unit in accordance with the invention with the actuator situated in the flow path and mechanically separated from the stator ("mechanically separated" here means that the actuator cannot be acted upon by mechanical means such as levers, shafts etc. from the stator, but is separated from the same by means of an uninterrupted, liquid and microbiologically tight barrier) it is made possible completely to avoid movable seals in contact with the contents. The unit, nevertheless will be drivable and controllable from the outside and will obtain a simple and purposeful design which, moreover, permits washing and sterilizing by known methods, e.g. hot steam or chemicals. The arrangement will be simple and not highly cost-demanding at the same time as obtaining a sturdy construction which is suitable for handling of the most varied types of fluids. Finally the unit may be used optionally for different mechanical applications such as a pump or a valve arrangement.

A preferred embodiment of the unit in accordance with the invention will now be described in greater detail with special reference to the attached schematic drawings which only show the details indispensable for an understanding of the invention.

Figure 1:
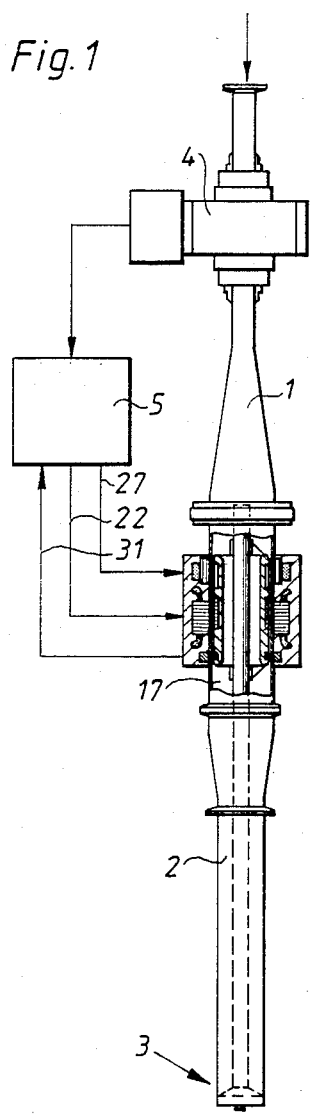
FIG. 1 shows partly in section a unit for flow control in accordance with the invention.
Figure 2:
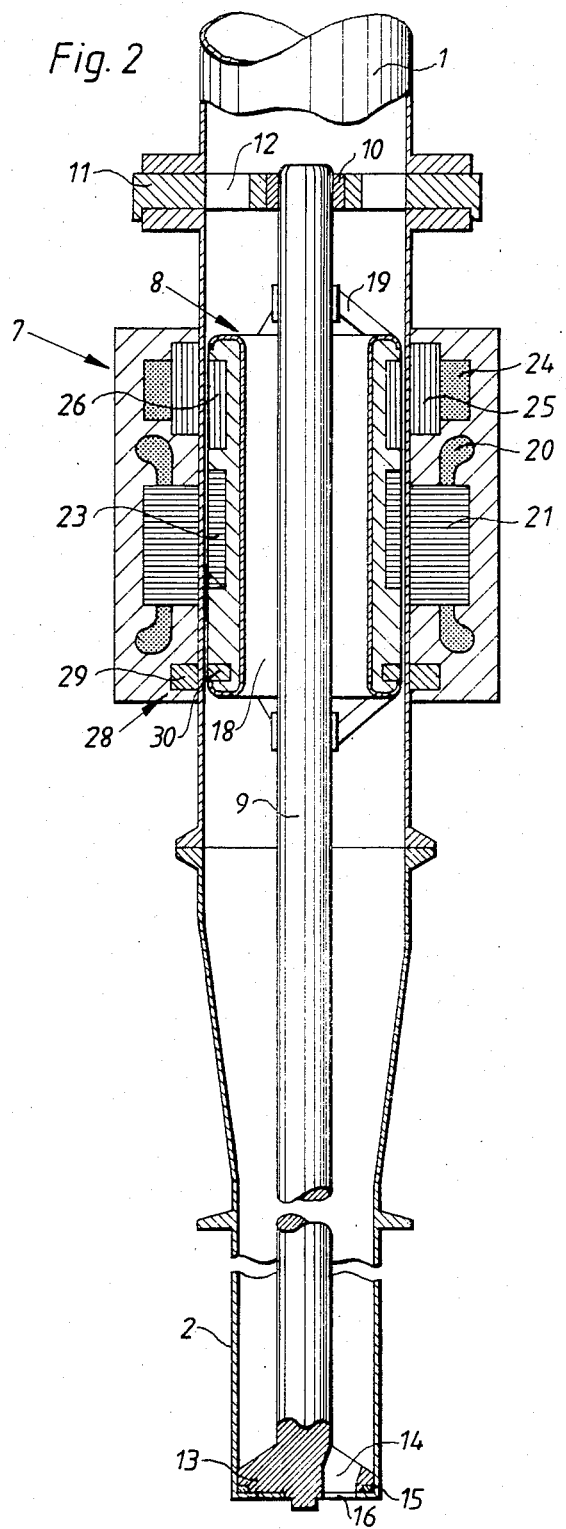
FIG. 2 shows on a larger scale a part of the unit in accordance with FIG. 1 in cross-section.

The unit in accordance with the invention is shown in its preferred embodiment as it can be designed for use in a packing machine of known type which portions out defined amounts of contents, e.g. milk, sour milk or juice, into preformed packing containers. The contents are passed to the packing container via a feed line 1, whose bottom end is designed as a filling pipe 2 with a device acting upon the flow in the form of a valve 3. The unit in accordance with the invention comprises a magnetically inductive flow meter 4, which is of a known type and generates a control signal which is passed to a control equipment 5. With the help of the control equipment, which compares the flow signal with a predetermined set-point curve, a control signal is generated to a driving means 6 for the valve 3 so that the flow through the filling pipe 2 is controlled to agreement with a predetermined value. When the flow meter 4 indicates that the desired quantity of contents has passed, the control equipment 5 gives a signal to the driving means 6 to urge the valve 3 towards the closed position which makes possible to fill with good accuracy each individual packing container with the desired amount of contents.

The driving means 6 comprises a stator 7 firmly mounted around the upper end of the filling pipe and an actuator 8 placed inside the same in the flow path which is connected via a shaft 9 to the flow-controlling device or the valve 3 at the bottom end of the filling pipe 2. The shaft 9 is supported at its upper end in a bearing 10 which is held up by the bearing disc 11 firmly connected to the feed line 1. The bearing disc 11 is provided with flow passages 12 through which the pumped liquid fluid or the contents can pass.

The shaft 9 is connected at its bottom end to a valve body 13 which comprises a number of flow passages 14. The valve body 13 rests with its bottom end against a valve seat 15 which has openings 16 corresponding to the openings 14. The valve body 13 is rotatable so as to bring the openings 14, 16 straight before one another, or, in closed position of the valve 3, bring the openings 14 straight before a number of solid parts of the valve seat situated between the openings 16. The shaft 9 can perform a rotational movement as well as an axial movement. The latter means that the valve body 13 is lifted off the valve seat 15, which e.g. facilitates washing and cleaning of the valve, as will be explained in greater detail in the following.

The driving means 6, as mentioned earlier, comprises the stationary stator 7 which is situated outside the flow path and is liquid-tight and microbiologically separated from the same with the help of the cylindrical wall of the feed line 1, and the actuator 8 which is situated in the flow path. The driving means, more particularly, is located in a widened part of the flow path which forms a chamber 17 whose inside diameter is only a few percent greater than the outer diameter of the actuator 8. Beside the passage formed as a result between the outer surface of the cylindrical actuator 8 and the surrounding, cylindrical pipe wall, a passage 18 exists between the likewise cylindrical internal wall surface of the actuator 8 and the shaft 9. The flow area in this passage 18 corresponds substantially to the free flow area in the filling pipe 2. The actuator 8 is connected rigidly to the shaft 9 via a number of fixed arms 19 at the upper and lower end of the actuator.

The stator 7 as well as the actuator 8, as mentioned earlier, are substantially cylindrical or annular and situated concentrically in relation to one another, and the actuator 8 is adapted to rotate the shaft 9 or be displaced in axial direction of the shaft 9 through action by means of the magnetic field of forces generated by the stator. To this end the stator 7 comprises an operating winding 20 around a stator core 21, this winding being adapted so as to be connected via the control equipment 5 and an electrical connecting line 22 to a source of current (not shown). Through this an electromagnetic field of forces is generated which influences an actuator magnet 23 so that the actuator 8 is rotated around the shaft 9. The actuator magnet 23 is displaced slightly in upwards direction in relation to the stator core of the operating winding 20 which means that the field of forces generated not only acts upon the actuator magnet 23 in rotational direction, but also seeks to urge the same to assume a position at a level with the stator core 21, which thus creates a downwards directed force which via the shaft 9 is transferred to the valve body 13 and causes thesame to rest against the valve seat 15.

Beside the operating winding 20 the stator 7 comprises a solenoid winding 24 and a solenoid core 25 which are situated at some distance above the operating winding 20. The actuator 8 has corresponding secondary poles 26 which are slightly displaced downwards in relation to the solenoid core 25. When the solenoid winding 24 via a line 27 is fed with current from the control equipment 5 a magnetic field of force will act upon the secondary poles 26 so that these together with the actuator 8 and the shaft 9 are lifted slightly upwards in axial direction. This influences vis the bottom end of the shaft 9 the valve body 13 so that the same is lifted slightly from its contact against the valve seat 15.

The driving means 6 comprises beside the two windings 20, 24 also a position indicator 28 which consists of two parts, namely a stator part 29 and an actuator part 30 surrounded by the same. The position indicator 28, which may be an angular position measuring system of conventional type, provides the control equipment 5 via the line 31 with a signal which gives information on the present rotational position of the actuator 8 in relation to the stator 7 thus providing a measure of the degree of opening of the valve 3 and being able to be used in combination with the signal from the flow meter 4 for controlling the current feed to the operating winding 20 so that the desired volume of flow per unit of time is obtained.

When the unit in accordance with the invention is used in a packing machine of the conventional type for the proportioning out of liquid contents to packing containers placed at the bottom end of the filling pipe provided with a valve, first of all the set value which is to be applicable is transmitted to the control equipment 5, that is to say information regarding the quantity of contents which is to pass the flow meter 4 on filling of a packing container with the required quantity of contents, and possibly also a predetermined curve for the opening and closing of the valve 3. On starting of the packing machine contents are introduced in the first place so that the feed line as well as the filling pipe 2 will be wholly filled with contents. When production actually commences the valve 3 is opened in the first place owing to the control equipment 5 connecting the operating winding 20 to a source of current (not shown) so that a field of forces is created which acts upon the actuator magnet 23 so as to rotate via the fixed arms 19 the shaft 9, and with it the valve body 13, to the open position. In order to obtain a smooth opening process, the opening possibly may be done according to a predetermined opening curve which, as mentioned earlier, is programmed into the control equipment 5. The control equipment 5 is continuously informed regarding the present rotational position of the actuator 8 with the help of the position indicator 28, whose information concerning the angular position of the actuator 8 in relation to the stator 7 is fed continuously to the control equipment 5 via the line 31.

As soon as the valve body 13 has been rotated to such a position that its flow passages 14 commence to overlap the flow passages 16 of the valve seat 15 the contents can flow out through the valve 3, and the flow of contents through the filling pipe 2, the feed line 1 and the flow meter is started. With the help of the flow meter 4 the control equipment 5 is informed continuously regarding the actual flow, and the opening area of the valve 3 is controlled by means of the control equipment 5 so that the required volume of contents is able to pass during the available time. When the correct quantity of contents for the filling of a packing container to the required level has passed the flow meter 4, the control equipment 5 acts upon the operating winding 20 via the line 22 so that the actuator magnet 23 rotates the actuator 8 to a position wherein the valve body 13 with the help of the shaft 9 is returned to its closed position. The closing of the valve 3 too may possibly be done according to a predetermined curve, the control equipment 5 being informed continuously of the angular position of the actuator 8 by means of the position indicator 28, as in the opening process. When filling contents of an uncomplicated behaviour a purely reciprocating control may be chosen, whereas contents which are difficult to handle, e.g. contents which tend to froth during the filling process, are handled better by setting the control equipment so that the opening as well as the closing process take place acording to a predetermined curve appropriate for the particular contents. The filling process does not have to be controlled by a flow meter, but may also be coupled to some other measuring device, e.g. a level indicator or be time-controlled.

The design of the unit in accordance with the invention with an actuator located in the flow path which is acted upon and is driven from the outside with the help of an electromagnetic field of forces makes it possible to maintain the flow path wholly separated from the environment, since any mechanical connection between the actuator part located in the flow path and means located outside the flow path is not necessary. As a result the wall of the chamber 17 can be made smooth and wholly without bushings for movable axles or other manoeuvring means, thus making it possible to meet the very high demands which are made on the handling of liquid foodstuffs and especially on the handling of such liquid foodstuffs which have been previously sterilized, e.g. through heat treatment. The design of the actuator with a large central flow passage 18 means that the contents can pass easily, and the absence of contact surfaces between movable and fixed parts (apart from the bearing 10) renders the arrangement very easy to clean and to sterilize. To this contributes, of course, also the simple design of the construction and the fact that the parts present in the flow path can be made of non-corroding material which, moreover, is resistant to normally used washing and cleaning agents such as steam and caustic soda.

To facilitate the washing of the valve 3 as well as of the actuator 8 and the inner wall surface of the chamber 17, the actuator 8 together with the shaft 9 and the valve body 13 can be raised to an upper position or possibly oscillate between an upper and a lower position during the course of the washing. This can be achieved in that the solenoid winding 24 via the line 27 and the control equipment 5 is connected to an electric source of current (not shown) so that an electromagnetic field of force is generated which acts upon the secondary poles 26 displaced in a direction axially downwards towards the valve 3, so that they are lifted and centred in relation to the solenoid core 25. Through this the valve body 13 too is lifted off its contact with the valve seat 15 so that a passage is formed through which can pass the cleaning liquid or sterilizing medium. The movement of the actuator 8, on the one hand rotational and on the other hand upwards and downwards during the washing process facilitates the cleaning, not only in the space between the valve body 13 and the valve seat 15 but also in the space between the outer cylindrical surface of the actuator 8 and the interior wall of the chamber 17.

The unit in accordance with the invention may be used also for the control of other types of devices acting upon the flow, e.g. other valve types, pumps or the like.

The unit thus may be combined with valves of other types, e.g. axially movable valves, with the function of the windings 20, 24 being changed round so that the normal operating movement is axial whilst a rotary or twisting movement may be used in connection with the washing process. It is also possible to make the shaft 9 appreciably shorter or possibly eliminate it if the actuator 8 itself is designed as a valve body. The actuator 8 may also be designed as a pump rotor or a pump piston with rotary motion or axial motion respectively. Since the unit in accordance with the invention definitively solves previous problems and eliminates the need for a movable manoeuvring part which passes the delimiting wall of the flow path, a very great number of other types of pumps and valves too may be used of course within the scope of the concept of the invention.

What is claimed:

1. A flow valve comprising:
   a housing defining a flow path between a feed line portion and a filling pipe portion;
   a shaft means disposed within said housing, said shaft means having an axis extending in a longitudinal direction of said flow path;
   a valve body fixed to an end portion of said shaft means and positioned at said filling pipe portion of said housing, said valve body having at least one aperture that is selectively positionable into and out of alignment with at least one corresponding outlet hole of said filling pipe portion according to rotational movement of said shaft means; and,
   driving means for directing the flow situated between said feed line portion and said filling pipe portion of said housing, said driving means including an actuator and a stator wherein said actuator is situated within a chamber of said flow path and is attached to said shaft and said stator is situated substantially outside of said flow path in a position surrounding said actuator, said actuator being mechanically separated from said stator and said stator being substantially sealed from said flow path, said actuator being rotatable around said longitudinal axis by electromagnetic forces applied to said actuator by said stator to selectively position said at least one aperture of said valve body into and out of alignment with said at least one corresponding outlet hole of said filling pipe portion so as to selectively open and close said valve, said driving means further including at least one set of windings connectable to a source of current for generating electromagnetic forces for driving said actuator.

2. A flow valve in accordance with claim 1, wherein said actuator is displaceable in said longitudinal direction of the flow path.

3. A flow valve in accordance with claim 1, wherein said drive means includes first windings that are connectable to a source of current to give the actuator a rotary movement around said longitudinal axis, and wherein said drive means includes second windings that are connectable to a source of current to displace the actuator axially so that said valve body is lifted off a seat of said filling pipe portion of said housing.

4. A flow valve in accordance with claim 1, wherein said at least one set of windings are positioned offset from said actuator in a direction towards the valve body so as to generate an axial force which urges the valve body to rest against a valve seat of said filling pipe portion of said housing when said actuator is rotated by said electromagnetic forces.

5. A flow valve in accordance with claim 1, wherein said shaft means is integral with said actuator.

6. A flow valve in accordance with claim 5, wherein the actuator is integral with said valve body.

7. A flow valve in accordance with claim 1, wherein the driving means further comprises a position indicator which is connected to a control equipment for the control of the movement of the actuator.

8. A flow valve in accordance with claim 7, further comprising a flow meter situated in the flow path, an output signal of said flow meter being provided to the control equipment.

9. A flow valve in accordance with claim 7, wherein the control equipment comprises a program for the operation of the actuator in accordance with a predetermined curve.

10. A flow valve in accordance with claim 1, wherein the flow path is microbiologically separated from the environment.

* * * * *